United States Patent
Izumihara et al.

(10) Patent No.: US 9,355,617 B2
(45) Date of Patent: May 31, 2016

(54) INFORMATION PROCESSING APPARATUS, INFORMATION PROCESSING METHOD AND PROGRAM FOR IMPROVING USER OPERABILITY

(71) Applicant: Sony Corporation, Tokyo (JP)

(72) Inventors: Atsushi Izumihara, Tokyo (JP); Shoichiro Moriya, Tokyo (JP); Akemi Tazaki, Tokyo (JP); Fuminori Homma, Tokyo (JP); Yasushi Okumura, Tokyo (JP); Ken Miyashita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 414 days.

(21) Appl. No.: 13/788,184

(22) Filed: Mar. 7, 2013

(65) Prior Publication Data

US 2013/0249926 A1    Sep. 26, 2013

(30) Foreign Application Priority Data

Mar. 16, 2012  (JP) ................................ 2012-060670

(51) Int. Cl.

| G09G 5/37 | (2006.01) |
| G09G 5/39 | (2006.01) |
| G09G 5/373 | (2006.01) |
| G06F 3/147 | (2006.01) |
| G06F 3/01 | (2006.01) |
| G06F 3/0481 | (2013.01) |

(52) U.S. Cl.
CPC *G09G 5/37* (2013.01); *G06F 3/017* (2013.01); *G06F 3/04815* (2013.01); *G06F 3/147* (2013.01); *G09G 5/373* (2013.01); *G09G 2320/0261* (2013.01)

(58) Field of Classification Search
None
See application file for complete search history.

(56) References Cited

U.S. PATENT DOCUMENTS

| 6,020,891 | A | 2/2000 | Rekimoto | |
| 7,522,151 | B2 * | 4/2009 | Arakawa | G06F 3/038 345/156 |
| 2010/0125816 | A1 * | 5/2010 | Bezos | 715/863 |
| 2011/0285704 | A1 * | 11/2011 | Takeda et al. | 345/419 |
| 2012/0231881 | A1 * | 9/2012 | Matsunaga | 463/31 |
| 2012/0249741 | A1 * | 10/2012 | Maciocci | G06F 3/011 348/46 |

FOREIGN PATENT DOCUMENTS

JP    10-051711 A    2/1998

* cited by examiner

*Primary Examiner* — Tize Ma
(74) *Attorney, Agent, or Firm* — Chip Law Group

(57) ABSTRACT

There is provided an information processing apparatus including a positional information acquiring unit acquiring information related to a movement of an operation target by a user operation, and a display control information generating unit generating control information to control display content, based on the information related to the movement. Among a first direction component and a second direction component of the movement, the display control information generating unit preferentially generates the control information for the first direction component.

19 Claims, 17 Drawing Sheets

VERTICAL AND HORIZONTAL POSITIONS ARE INTENDED NOT TO BE CHANGED BUT ARE ACTUALLY CHANGED

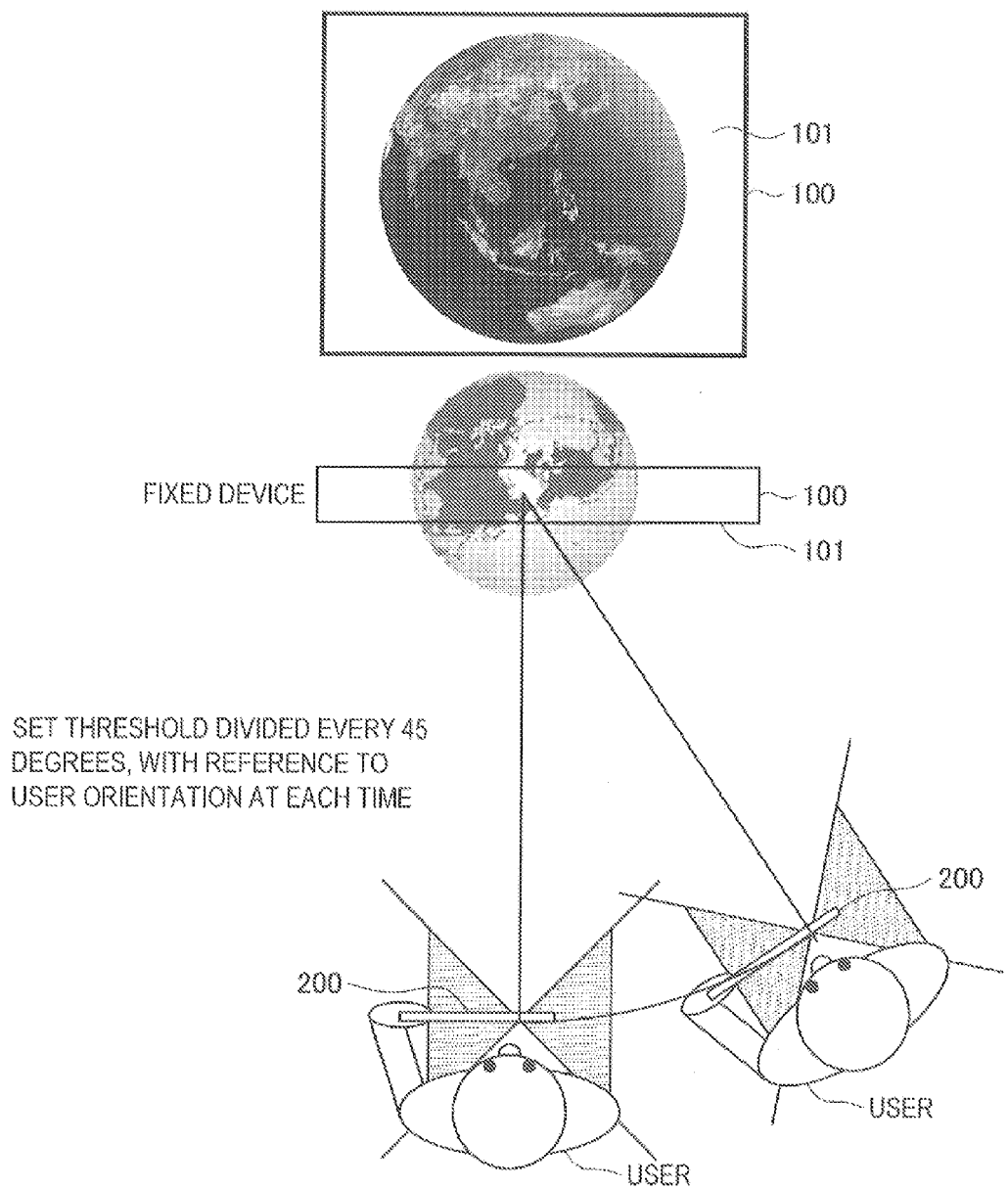

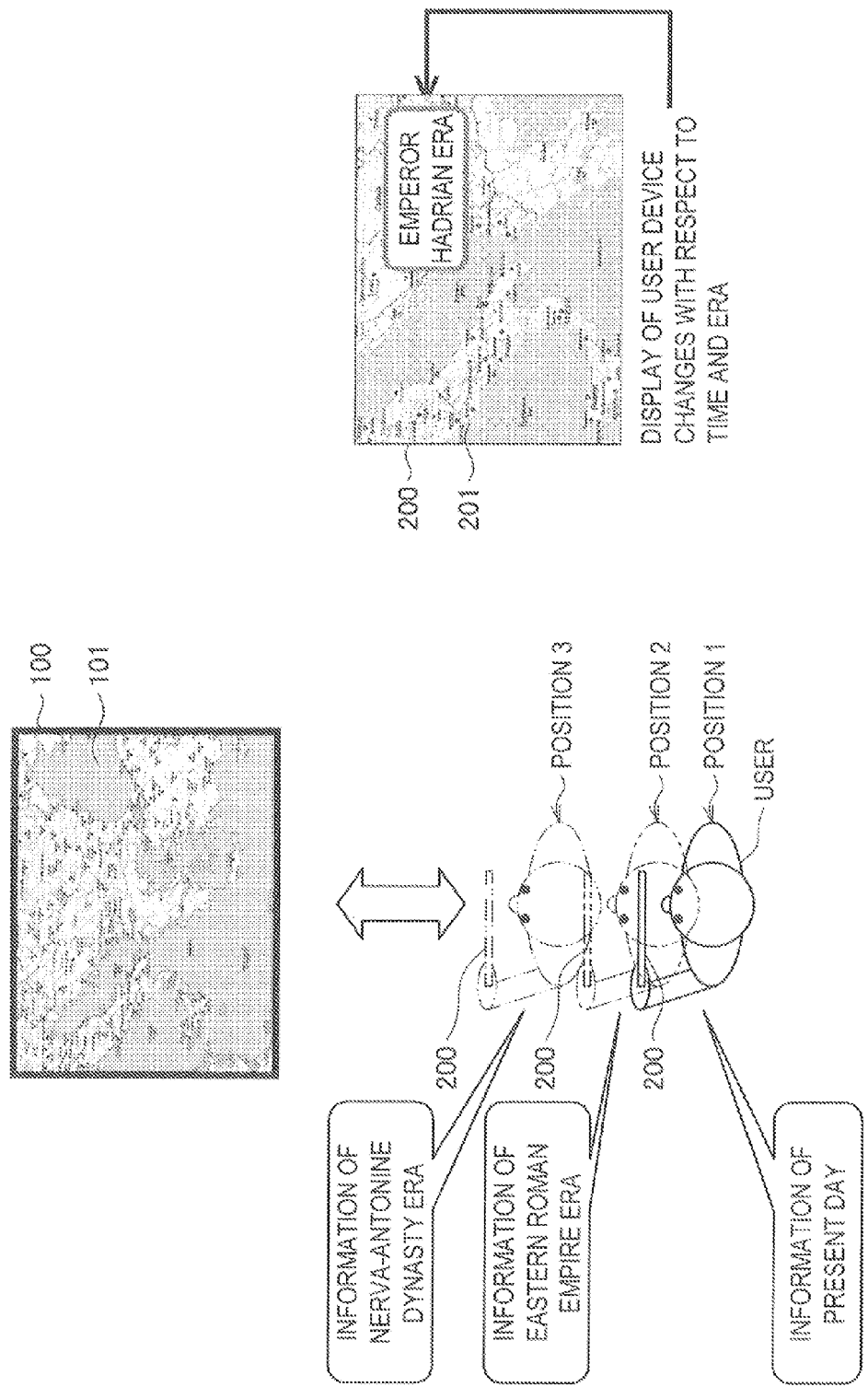

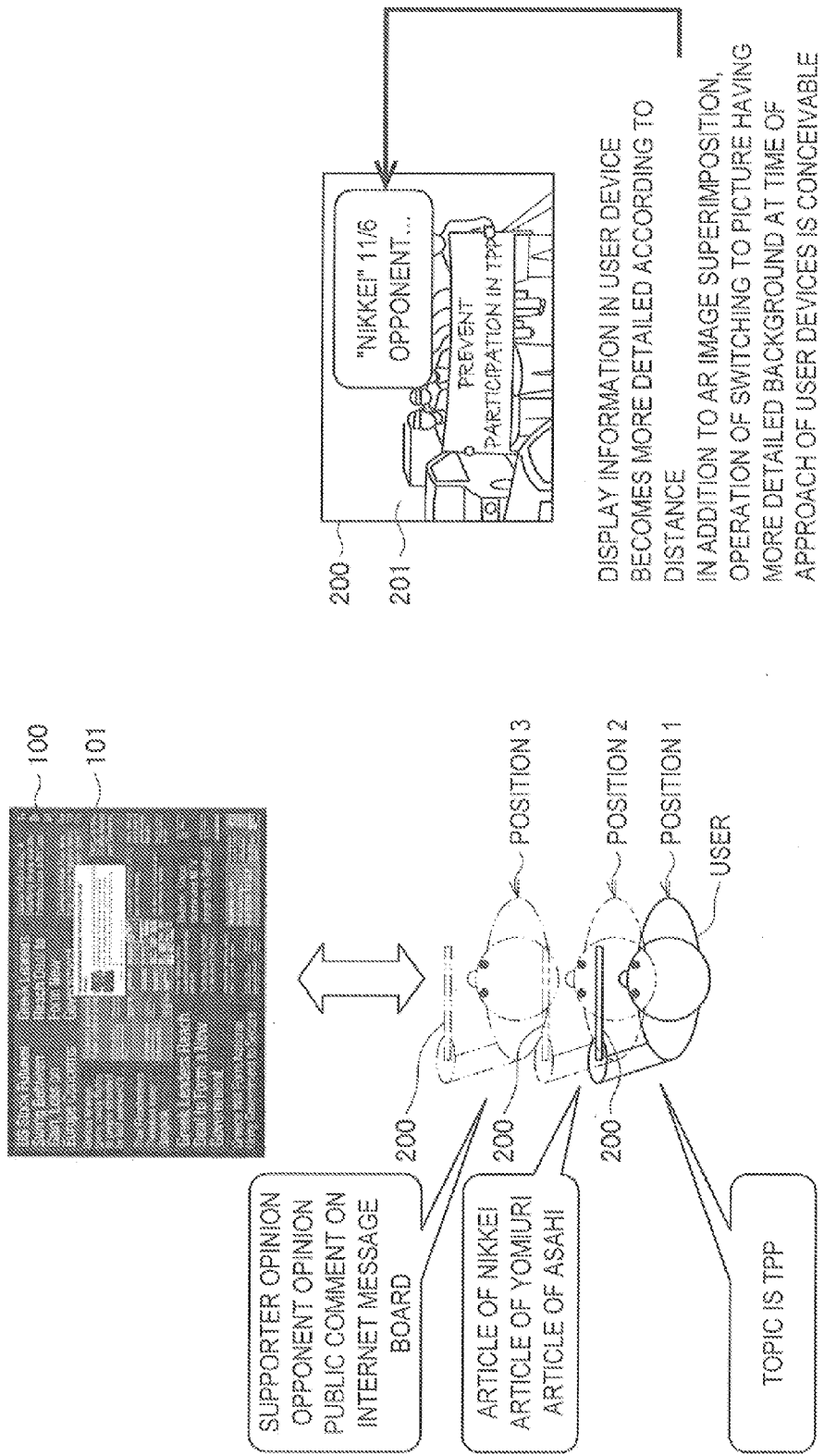

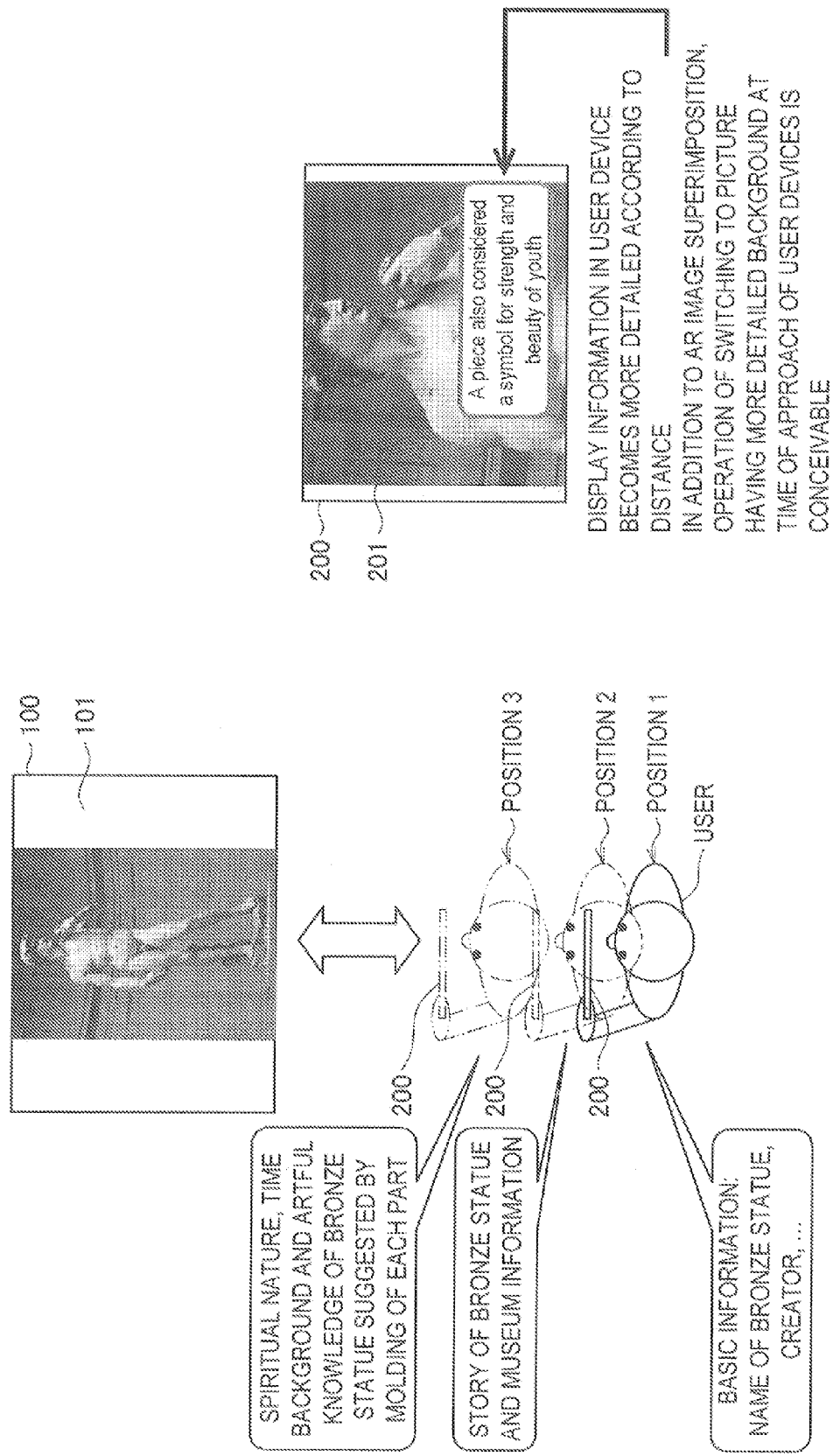

INFORMATION PROCESSING APPARATUS, INFORMATION PROCESSING METHOD AND PROGRAM FOR IMPROVING USER OPERABILITY

CROSS-REFERENCE TO RELATED APPLICATION

The present application claims priority from Japanese Patent Application No. JP 2012-060670 filed in the Japanese Patent Office on Mar. 16, 2012, the entire content of which is incorporated herein by reference.

BACKGROUND

The present disclosure relates to an information processing apparatus, an information processing method and a program.

In recent years, for example, there is known a technique (AR: Augmented Reality) of overlaying information related to a position of the landscape, which is imaged by a camera of a portable device such as a smartphone, on its display screen. For example, following Japanese Patent Laid-Open No. H10-51711 discloses a technique of: displaying a table as an image in the real world and a third-party apparatus on a screen of a portable display; displaying a three-dimensional imaginary object created by computer graphics or the like on the table; and simply switching to an operation in the virtual world only by looking at the screen of the portable display even when performing an operation in the real world.

SUMMARY

In such the above AR technique, when a portable device held by a user moves in a predetermined direction, by changing information displayed on the device depending on the movement, it is possible to further improve the user operability.

However, in a case where it is assumed to perform different display processing according to the moving directions of multiple devices, if a device moving direction intended by a user is recognized on the device side as a different direction movement, there arises a problem that it is not possible to display desired information.

Therefore, it is desirable to reflect user's device operation at high accuracy and change display content.

According to an embodiment of the present disclosure, there is provided an information processing apparatus including a positional information acquiring unit acquiring information related to a movement of an operation target by a user operation, and a display control information generating unit generating control information to control display content, based on the information related to the movement. Among a first direction component and a second direction component of the movement, the display control information generating unit preferentially generates the control information for the first direction component.

Further, the display control information generating unit cancels the second direction component of the movement to generate the control information.

Also, the predetermined direction may be the first direction toward an apparatus that displays the display content or the second direction orthogonal to the first direction.

Further, in a case where a magnitude of the second direction component of the movement is equal to or less than a predetermined value, the display control information generating unit cancels the second direction component of the movement to generate the control information.

Further, the first direction component may be a component of the movement along a direction toward an apparatus that displays the display content, and the second direction component may be a component along a direction orthogonal to the direction toward the apparatus that displays the display content.

Further, the information processing apparatus may further include a display controlling unit controlling display content displayed on a displaying unit, based on the control information.

Further, the information processing apparatus may further include an imaging unit imaging an object. The display controlling unit may control the display content including an image imaged by the imaging unit, based on the control information.

Further, the information processing apparatus may further include a transmitting unit transmitting the control information to a device having a displaying unit.

Further, the device includes the displaying unit includes an imaging unit. The information processing apparatus further includes an imaged displaying unit imaged by the imaging unit, and an imaged display controlling unit controlling display content in the imaged displaying unit based on the information related to the movement.

Further, the imaged display controlling unit may control the display content in the imaged displaying unit based on the information related to the movement, such that a range of an image of the imaged displaying unit imaged by the imaging unit does not change.

Further, based on the information related to the movement, the imaged display controlling unit may reduce the display content in the imaged displaying unit in a case where the device including the displaying unit comes close, and may enlarge the display content in the imaged displaying unit in a case where the device including the displaying unit comes away.

Further, based on the information related to the movement, in a case where the device including the displaying unit is moved in vertical and horizontal directions, the imaged display controlling unit moves the display content in the imaged displaying unit in same directions as directions of the movement.

Further, the display control information generating unit may change the predetermined value based on the information related to the movement.

Further, the display controlling unit may perform a process of selecting a target from information displayed on the displaying unit, based on the information related to the movement.

Further, the display controlling unit may change a detail level of information displayed on the displaying unit, based on the information related to the movement.

Further, the display controlling unit may change and display time-series content of information displayed on the displaying unit, based on the information related to the movement.

Further, according to an embodiment of the present disclosure, there is provided an information processing method including acquiring information related to a movement of an operation target by a user operation, and generating control information to control display content based on the information related to the movement for, among a first direction component and a second direction component of the movement, preferentially the first direction component.

Further, according to an embodiment of the present disclosure, there is provided a program for causing a computer to function as a mechanism acquiring information related to a movement of an operation target by a user operation, and a mechanism generating control information to control display content based on the information related to the movement for, among a first direction component and a second direction component of the movement, preferentially the first direction component.

According to an embodiment of the present disclosure, it is possible to reflect user's device operation at high accuracy and change display content.

BRIEF DESCRIPTION OF THE DRAWINGS

FIG. 16 is a pattern diagram illustrating a case where a user uses stereoscopic content (i.e. 3D image);

FIG. 17 is a pattern diagram illustrating an example where a display of a displaying unit changes as a device owned by a user moves in the distance direction;

FIG. 18 is a pattern diagram illustrating an example of a display of a news site; and FIG. 19 is a pattern diagram illustrating an example of a display of 3D content.

DETAILED DESCRIPTION OF THE EMBODIMENTS

Figure 1:
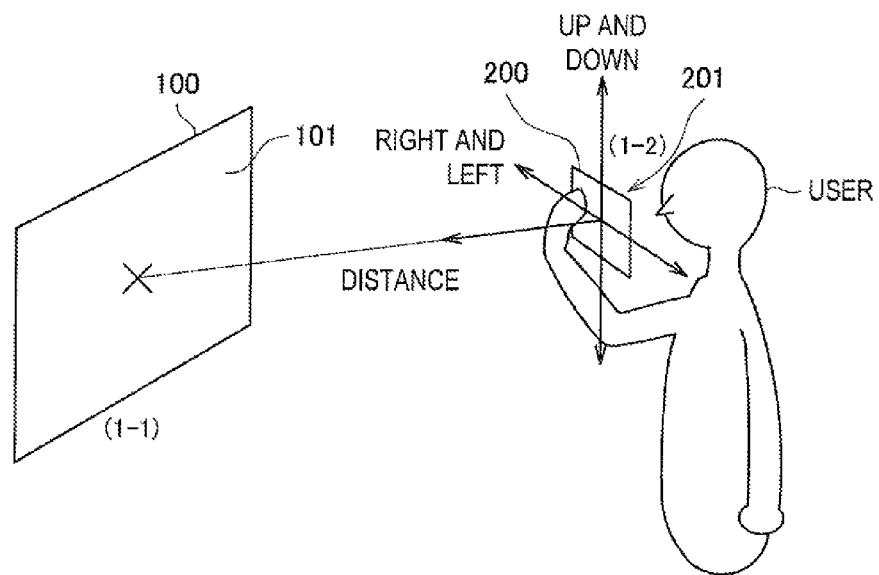
FIG. 1 is a pattern diagram illustrating an interaction based on the positional relationship and movement of a device owned by a user with respect to a device fixed to the space.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, the explanation will be given in the following order.
1. First embodiment
 1.1. Premise technique
 1.2. Regarding system configuration according to the present embodiment
 1.3. Regarding example of processing according to the present embodiment
2. Second embodiment (example of cancelling screen breakdown caused by device movement)
3. Third embodiment (example of changing decision criterion based on used content and device size, and so on)
4. Fourth embodiment (specific embodiment of change of display content caused by device movement)<

<1. First Embodiment>
[1.1. Premise Technique]

First, a premise technique of the present embodiment and its problem will be explained. As illustrated in FIG. 1, there is assumed an interaction based on the positional relationship and movement of a device 200 owned by a user with respect to a device 100 fixed to the space.

The device 100 denotes a display apparatus having a displaying unit 102 such as a liquid crystal display. Also, the device 200 denotes an apparatus having a displaying unit 202 like a liquid crystal display, such as a tablet terminal and a mobile device.

Figure 2:
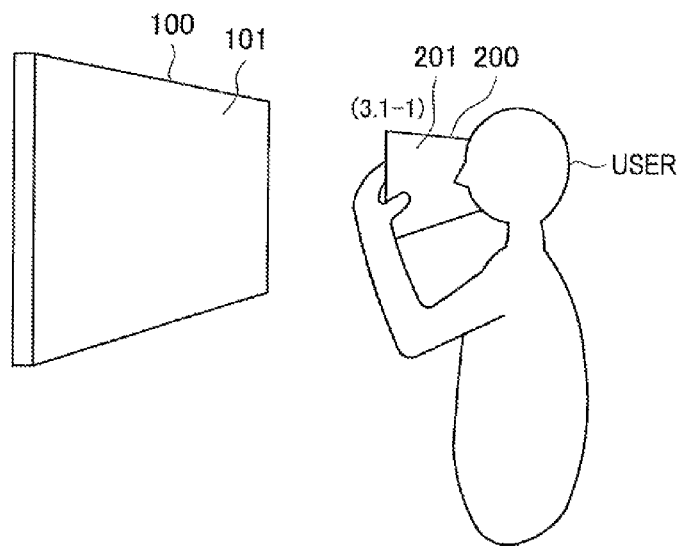
FIG. 2 is a pattern diagram illustrating an example of a device owned by a user.
Figure 3:
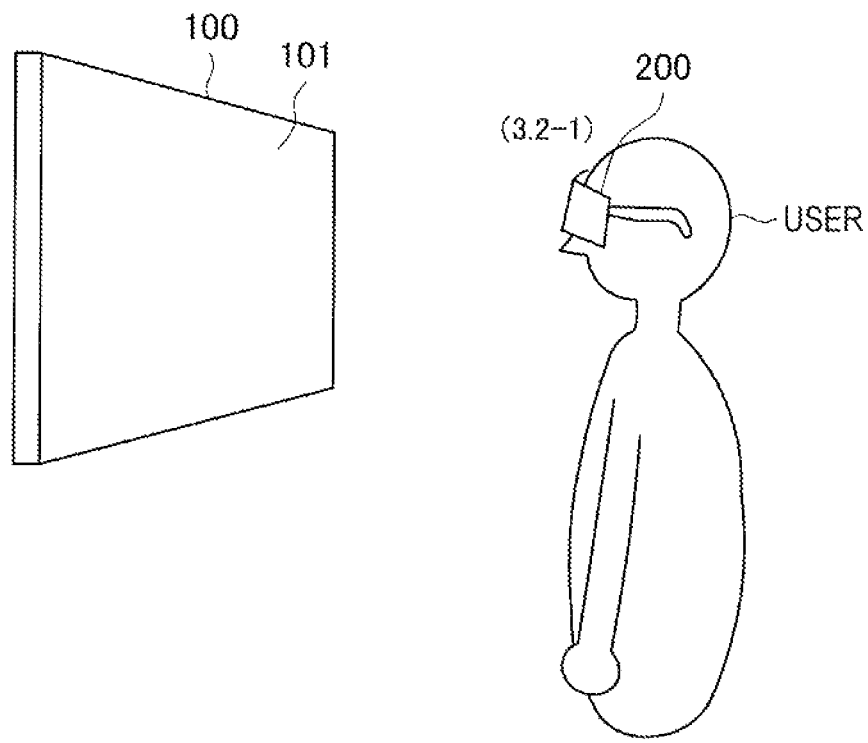
FIG. 3 is a pattern diagram illustrating an example of a device owned by a user.

FIG. 2 and FIG. 3 are pattern diagrams illustrating examples of the device 200 owned by the user. FIG. 2 illustrates a case where the device 200 is a handheld type. Also, FIG. 3 illustrates a case where the device 200 is a glasses type worn on the body. In the case of the example illustrated in FIG. 3, the user can have visual contact with information displayed on a displaying unit set on the glasses.

In the system illustrated in FIG. 1, in a scene in which the user looks at one or multiple imaginary objects arranged in the virtual space through the device 200 at hand, it is possible to freely move the user position (i.e. position of the device 200).

Here, as illustrated in FIG. 1, there is assumed a scene in which, using the fixed device 100 as the origin, the movement in the vertical and horizontal directions of the device 200 is assigned as a selection operation of target information, the movement in the distance direction (i.e. direction close to or apart from the device 100) is assigned as an operation of information granularity (i.e. fullness of information), and, by moving the device 200 by the user, information is acquired and the objects in the virtual space are subjected to interaction. In this case, if the user can freely move in the three-dimensional space, there arise the following problems.

Figure 4:
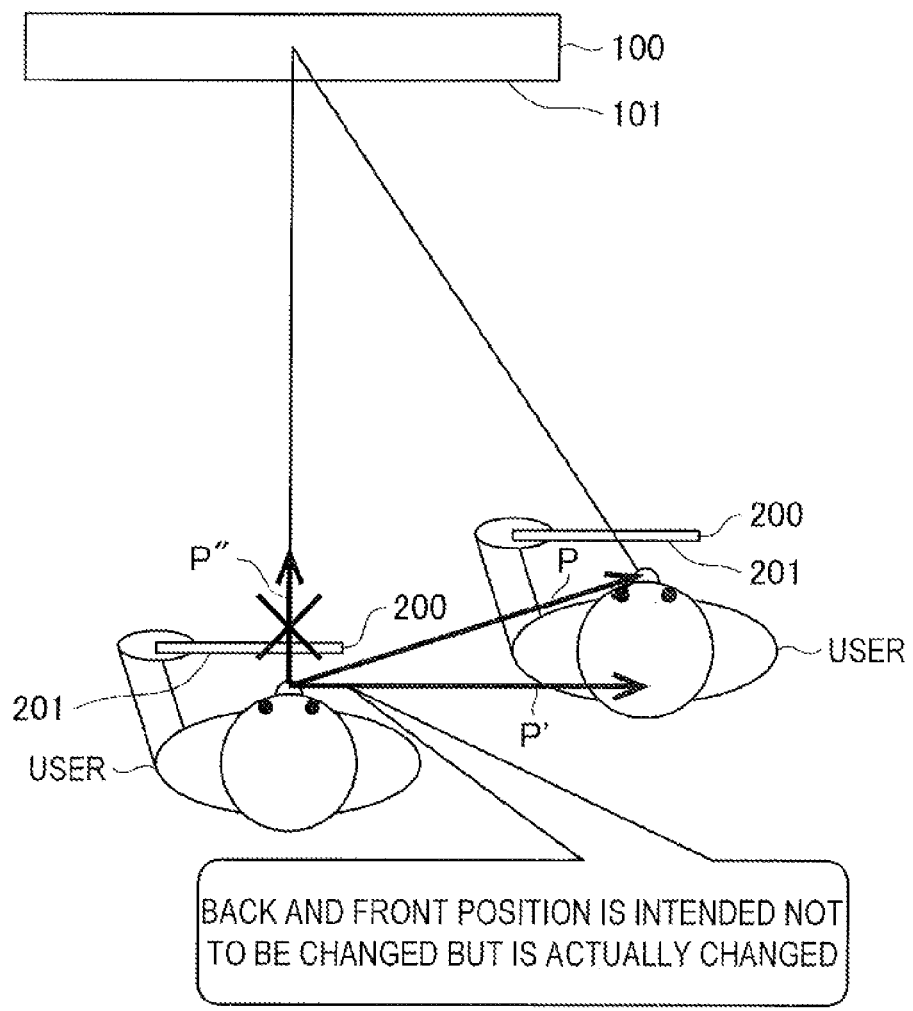
FIG. 4 is a pattern diagram illustrating states of a fixed device, a device owned by a user and the user, which are seen from the top.
Figure 5:
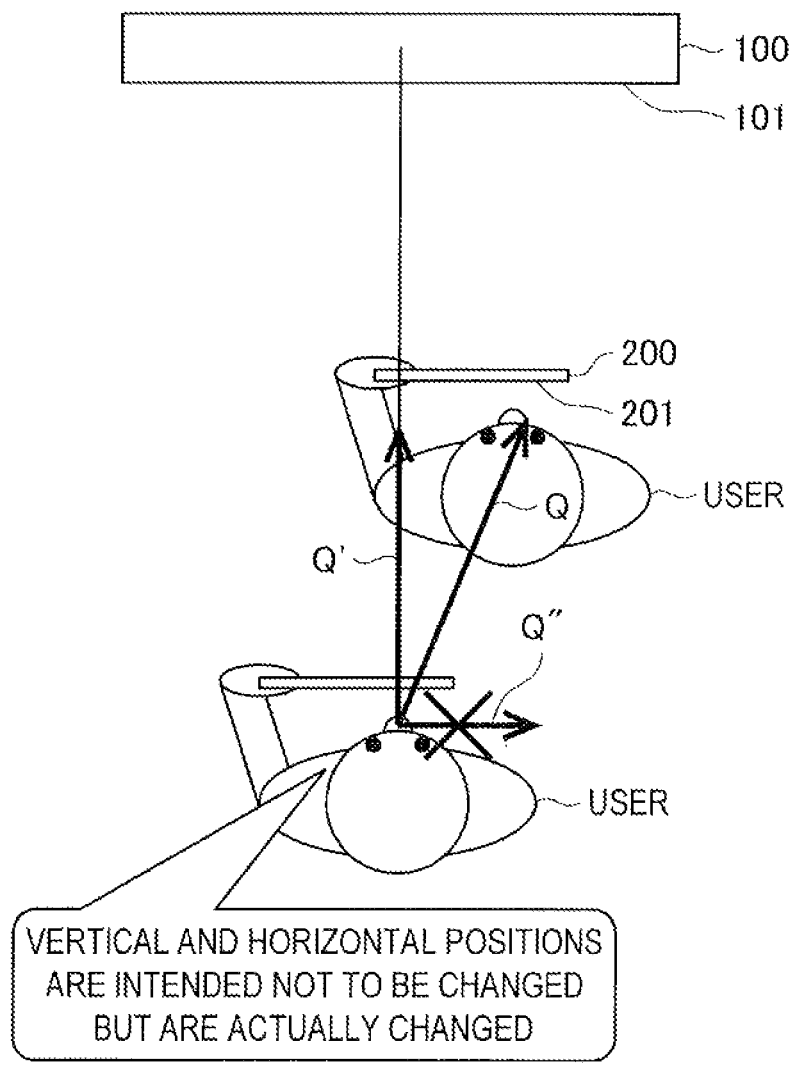
FIG. 5 is a pattern diagram illustrating states of a fixed device, a device owned by a user and the user, which are seen from the top.

FIG. 4 and FIG. 5 are pattern diagrams illustrating states of the device 100, the device 200 and the user, which are seen from the top. As described above, the user can select target information by moving the device 200 in the vertical and horizontal directions. However, as illustrated in FIG. 2, there is a case where, when the user intents to move the device 200 in the vertical and horizontal directions so as to access different type information, a distance from the fixed device 100 may change. Although the user intends to change the position of the device 200 in the vertical and horizontal directions and information displayed in a related manner on the device 200 without changing the distance between the device 100 and the device 200 and information displayed in a related manner on the device 200, a rigorous movement is difficult, which changes information corresponding to the distance direction.

Also, as illustrated in FIG. 5, there is a possible case where, although the user intends to move close to or away from the fixed device 100 so as to change information granularity (i.e. fullness of information), a movement in the vertical and horizontal directions is made. Although the user intends to change information displayed on the distance 200 in response to a distance only by changing the distance between the fixed device 100 and the device 200 without changing the position of the device 200 in the vertical and horizontal directions and information displayed in a related manner on the device 200, a rigorous movement is difficult on a path in which the distance from the fixed device 100 is the shortest, and, as a result, the device 200 moves in the vertical and horizontal directions and information displayed in a related manner on the device 200 changes.

Figure 6:
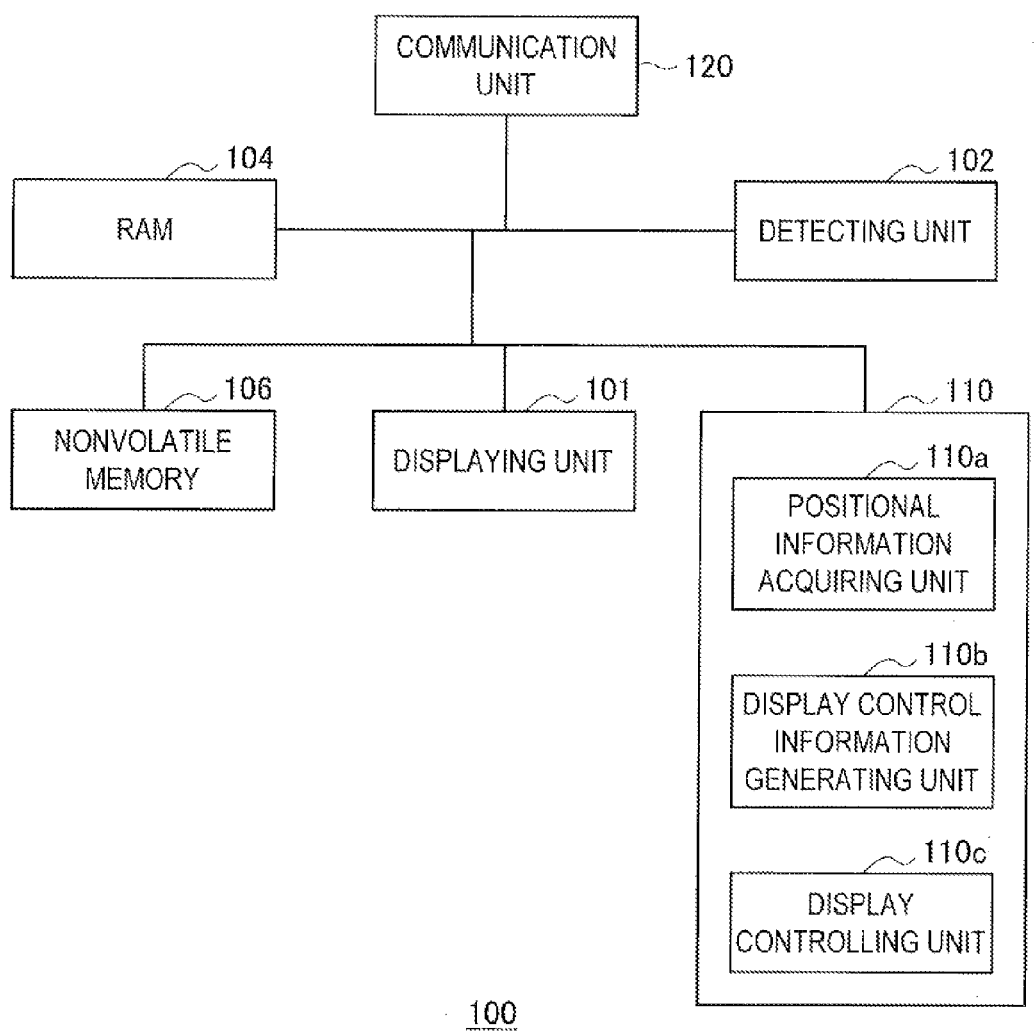
FIG. 6 is a block diagram illustrating a configuration of a fixed device.
Figure 7:
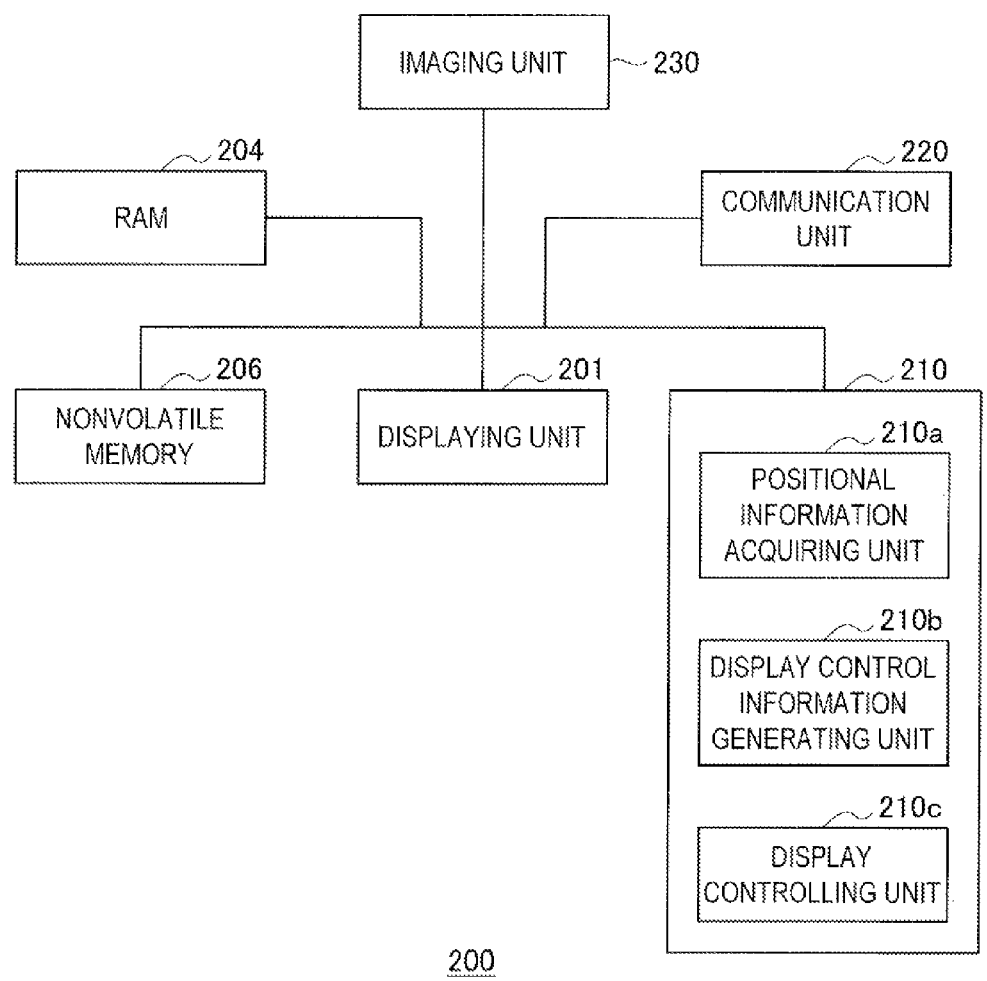
FIG. 7 is a block diagram illustrating a configuration of a device owned by a user.

Therefore, in the present embodiment, processing accurately reflecting user's intension is performed. FIG. 6 and FIG. 7 are pattern diagrams illustrating outlines of a system according to the present embodiment.

1.2. System Configuration According to the Present Embodiment

FIG. 6 us a block diagram illustrating a configuration of the device 100. Also, FIG. 7 is a block diagram illustrating a configuration of the device 200. As illustrated in FIG. 6, the device 100 employs a configuration including a detecting unit 102 to detect a movement of the device 200, a RAM 104, a nonvolatile memory 106, a displaying unit 101, a CPU 110 and a communication unit 120.

As illustrated in FIG. 7, the device 200 employs a configuration including a RAM 204, a nonvolatile memory 206, a displaying unit 201, a CPU 210, a communication unit 220 and an imaging unit (i.e. camera) 230.

In the configurations illustrated in FIG. 6 and FIG. 7, the detecting unit 102 of the device 100 detects the position and movement of the device 200. The CPU 110 generates control information to control display content, based on information related to the position and movement of the device 200 transmitted from the detecting unit 102. This control information is transmitted from the communication unit 120 to the device 200 based on an instruction of the CPU 110. Also, the device 100 can transmit information displayed on the displaying unit 101, from the communication unit 120 to the device 200.

An imaging unit 230 of the device 200 images the displaying unit 101 of the device 100. Information acquired by imaging is displayed together with related information, on the displaying unit 201. Also, the communication unit 220 of the device 200 can acquire information displayed on the displaying unit 101 from the communication unit 120 and display this information on the displaying unit 201.

The communication unit 220 of the device 200 receives information related to the position and movement of the device 200 transmitted from the device 100. The device 200 displays the information, which is displayed on the displaying unit 101 of the device 100, on the displaying unit 201. Subsequently, the device 200 changes display content of the displaying unit 201 based on the information related to the position and movement of the device 200 transmitted from the device 100.

The CPU 110 of the device 100 includes a positional information acquiring unit 110a, a display control information generating unit 110b and a display controlling unit 110c. The positional information acquiring unit 110a acquires information related to the movement by user's operation, which is detected in the detecting unit 102. The display control information generating unit 110b generates control information to control display content based on the information related to the movement, and, among the first direction component and second direction component of the movement, preferentially generates control information of the first direction component. Especially, in a case where the movement includes a movement in a predetermined direction (i.e. vertical and horizontal directions or distance direction) and a movement in a direction different from the predetermined direction, the display control information generating unit 110b cancels the movement in the direction different from the predetermined direction, and, based on the information related to the movement, generates control information to control display content. The display controlling unit 110c controls the display content in the displaying unit 101. Here, the term "preferentially" indicates a state where the degree of influence given to the display content by the first direction component is greater than the degree of influence given to the display content by the second direction component. To be more specific, it indicates a state where a weight larger than a control amount of the display content based on the second direction component is given to a control amount of the display content based on the first direction component, or a weight smaller than the control amount of the display content based on the first direction component is given to the control amount of the display content based on the second direction component. In addition, it includes the case of cancelling (or invalidating) the second direction component, validating the first direction component and generating control information.

Similarly, the CPU 210 of the device 200 includes a positional information acquiring unit 210a, a display control information generating unit 210b and a display controlling unit 210c. The positional information acquiring unit 210a acquires information related to the movement by user's operation, which is detected in the detecting unit 202. The display control information generating unit 210b generates control information to control display content based on the information related to the movement, and, among the first direction component and second direction component of the movement, preferentially generates control information of the first direction component. Especially, in a case where the movement includes a movement in a predetermined direction (i.e. vertical and horizontal directions or distance direction) and a movement in a direction different from the predetermined direction, the display control information generating unit 210b cancels the movement in the direction different from the predetermined direction, and, based on the information related to the movement, generates control information to control display content. The display controlling unit 210c controls the display content in the displaying unit 201.

For example, in a case where the device 200 moves in the vertical and horizontal directions, the device 100 transmits information that the device 200 moves in the vertical and horizontal directions, to the device 200. When receiving the information that the device 200 moves in the vertical and horizontal directions, the device 200 changes the display content of the displaying unit 201. To be more specific, as described above, the movement in the vertical and horizontal directions is found as a selection operation of target information, and the device 200 switches the selection operation of target information according to the movement in the vertical and horizontal directions. Specific changes of the display will be described later in detail.

In a case where the states as illustrated in FIG. 4 and FIG. 5 occur, the device 100 and the device 200 perform processing of changing the display content of the device 200 based on the movement in user's intentional direction. In other words, the device 100 and the device 200 cancel information related to a movement in a direction that is not intended by the user.

In a case where the state described in FIG. 4 occurs, the display control information generating units 110*b* and 210*b* cancel information (motion vector P'') related to the movement in the distance direction among information related to the movement of the device 200, and generate control information to control the display content based on only information (motion vector P') related to the movement in the vertical and horizontal directions. Also, the display control information generating units 110*b* and 210*b* give a larger weighting to information (motion vector P') related to the movement in the vertical and horizontal directions than information (motion vector P'') related to the movement in the distance direction, and preferentially generates control information for the information (motion vector P') related to the movement in the vertical and horizontal directions.

Also, in a case where the state described in FIG. 5 occurs, the display control information generating units 110*b* and 210*b* cancel information (motion vector Q'') related to the movement in the vertical and horizontal directions among information related to the movement of the device 200, and generate control information to control the display content based on only information (motion vector Q') related to the movement in the distance direction. Also, the display control information generating units 110*b* and 210*b* give a larger weighting to information (motion vector Q') related to the movement in the distance direction than information (motion vector Q'') related to the movement in the vertical and horizontal directions, and preferentially generates control information for the information (motion vector Q') related to the movement in the distance direction.

Also, in the display control information generating units 110*b* and 210*b*, the processing of cancelling processing related to the movement in the direction that is not intended by the user and generating control information may be performed by one of the display control information generating units of the devices 100 and 200.

In the case of generating control information on the side of the device 100, the control information is transmitted from the communication unit 120 to the communication unit 220, and the display controlling unit 210*c* of the device 200 controls the display in the displaying unit 201 based on the control information.

Also, in the case of generating control information on the side of the device 200, the display controlling unit 210*c* of the device 200 controls the display in the displaying unit 201 based on the control information. In this case, information related to the position and movement of the device 200, which is detected in the detecting unit 102 of the device 100, is transmitted from the communication unit 120 to the communication unit 220. Based on the information related to the position and movement received in the communication unit 220, in a case where the movement of the device 200 includes a movement in a direction different from a predetermined direction, the display control information generating unit 210*b* of the device 200 cancels information related to the movement and generates control information to control display content.

Also, by imaging a predetermined landmark of the device 100 (for example, a frame of the displaying unit 101 of the device 100), the imaging unit 230 of the device 200 can acquire information related to the position and movement of the device 200 from the size of this landmark. Therefore, information related to the position and movement of the device 200 can be detected from an image taken by the imaging unit 230 of the device 200 too. In this case, the positional information acquiring unit 210*a* acquires information related to a movement by user's operation, from the image taken by the imaging unit 230.

Figure 8:
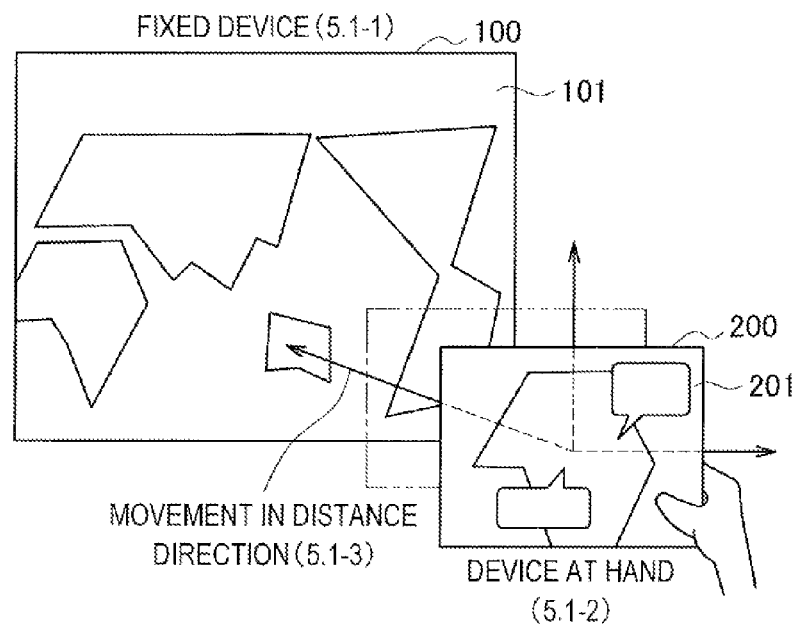
FIG. 8 is a pattern diagram illustrating a case where a user moves and operates a device.

FIG. 8 is a pattern diagram illustrating a case where the user moves and operates the device 200. In the example illustrated in FIG. 8, a wide-area map is displayed on the displaying unit 101 of the fixed device 100 and the user holds the imaging unit 230 of the device 200 at hand, over the side of the device 100. By this means, the device 200 acquires information displayed on the displaying unit 108 of the fixed device 100 and displays this information on the displaying unit 201. On the displaying unit 208, the user can have visual contact with the information displayed on the displaying unit 101.

In this system, the vertical and horizontal movement of the device 200 by the user is recognized as the movement of a position focused by the user. By this means, for example, in a case where, before the device 200 moves, the imaging unit 230 focuses "Japan" and "Japan" on a map is displayed on the displaying unit 201, when the device 200 is moved in a direction in which the imaging unit 230 focuses "Korea," after the device 200 is moved, an area ("Korea") different from "Japan" is displayed on the displaying unit 201 based on the movement direction. Thus, by moving the device 200 in the vertical and horizontal directions, the user can change selection target information.

Also, the movement in the distance direction of the device 200 by the user is mapped on an operation to go back to the time at the spot and select information per time. For example, when the user causes the device 200 to be close to the device 100 in a state where "Japan" is displayed on the displaying unit 201, information related to the past history of "Japan" is displayed, and, as the distance between the device 100 and the device 200 becomes shorter, information in older time is displayed.

Figure 9:
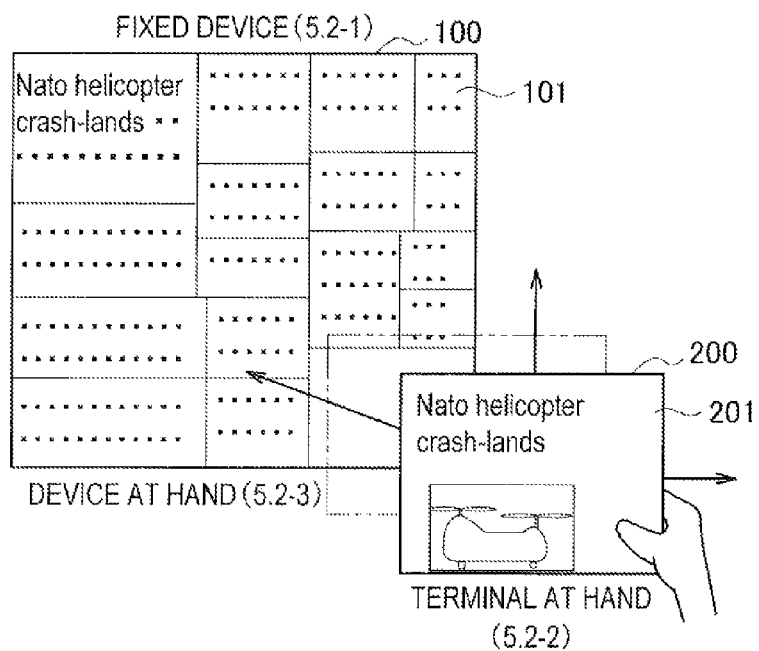
FIG. 9 is a pattern diagram illustrating an example of displaying much news information on a displaying unit of a fixed device.

In the example illustrated in FIG. 9, much news information is displayed on the displaying unit 101 of the fixed device 100, and the user holds the imaging unit 230 of the device 200 at hand, over the device 100, and, on the displaying unit 201, looks at information displayed on the displaying unit 101 of the device 100. In this system, user's vertical and horizontal movement is recognized as an operation to select news attracted by the user. By this means, for example, in a case where certain news 1 is displayed on the displaying unit 201 before the movement, different news 2 is displayed on the displaying unit 201 based on the movement direction after the movement of the device 200.

Also, the movement of the device 200 in the distance direction by the user is mapped on an operation to select detailed news information, associated information and information related to past articles. For example, when the user causes the device 200 to be closer to the device 100 in a state where the certain news 1 is displayed on the displaying unit 201, regarding the news 1, more detailed information, associated information and information related to past articles are displayed.

Thus, in the present embodiment, it is possible to perform different processing between an operation to vertically and horizontally move the device 200 and an operation to cause the device 200 to be close to (or away from) the device 100.

Meanwhile, as descried in FIG. 4 and FIG. 5, when the user operates the device 200, there is a case where the user unconsciously performs operations including an operation in the vertical and horizontal directions and an operation in the distance direction. For example, when the user moves the device 200 vertically and horizontally, there is a case where the distance 200 moves in the distance direction. In this case, if the movement in the distance direction that is not intended by the user is reflected to display processing in the displaying unit 201, a feeling of strangeness is caused in user's sense.

Therefore, in the present embodiment, at the time the user intends to perform a vertical and horizontal operation of the device 200, in a case where it includes a movement in the distance direction, if the movement in the distance direction is not over a predetermined threshold, it is regarded that the movement in the distance direction is not provided. Similarly, at the time the user intends to perform an operation in the distance direction of the device 200, in a case where the movement includes a vertical and horizontal movement, if the vertical and horizontal movement is not over a predetermined threshold, it is regarded that the movement in the vertical and horizontal directions is not provided.

1.3. Regarding Example of Processing According to the Present Embodiment

Figure 10:
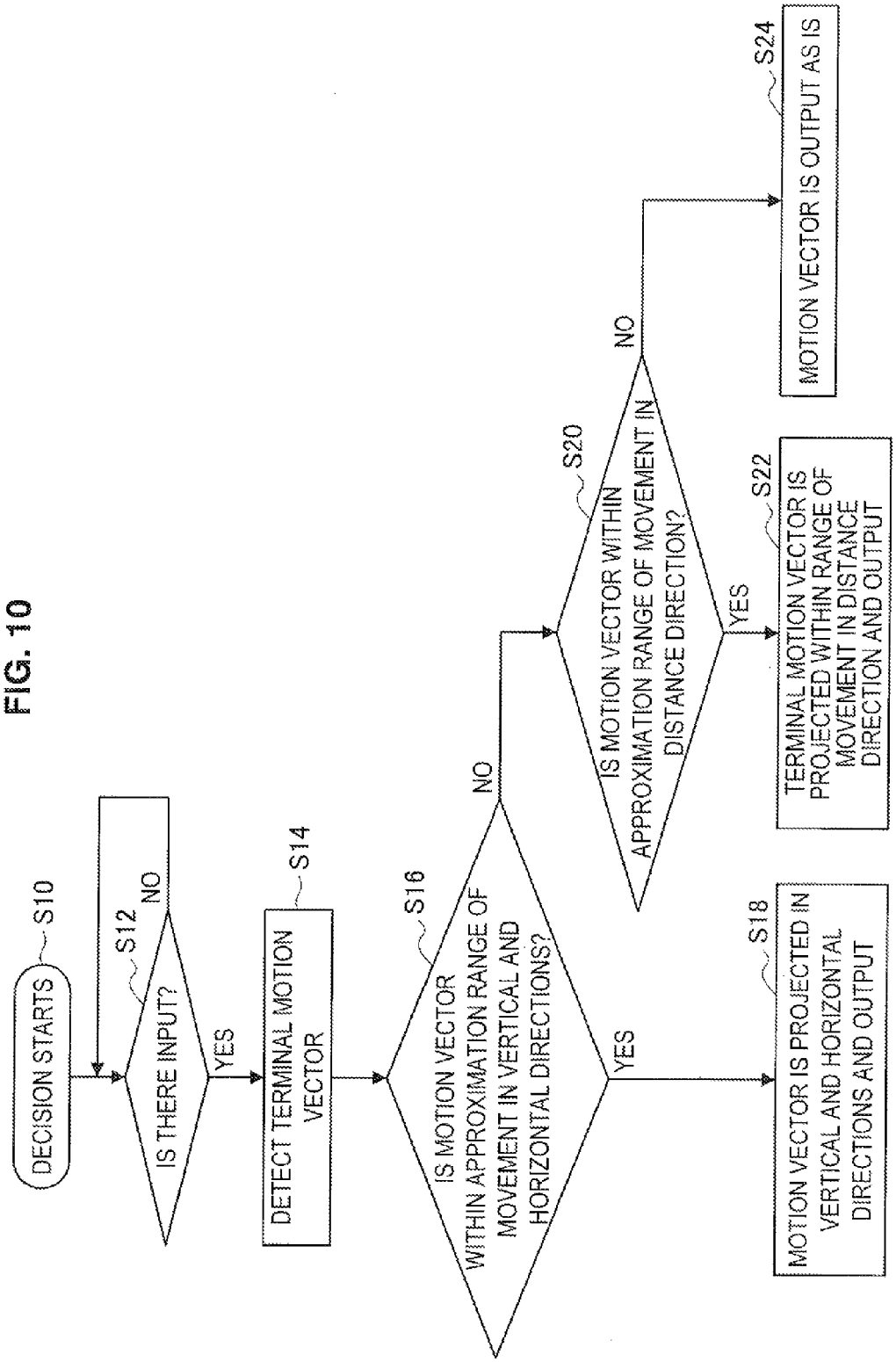
FIG. 10 is a flowchart illustrating an algorithm of a first embodiment.

FIG. 10 is a flowchart illustrating an algorithm according to the present embodiment. As illustrated in FIG. 4, in a case where the motion vector P of the movement of the device 200 by the user is within a range in which it can be actually decided as a movement in the vertical and horizontal directions, the motion vector P' acquired by projecting the motion vector P in the vertical and horizontal directions is output. By this means, based on the motion vector P', information displayed on the displaying unit 201 is selected. In this case, since the motion vector P" acquired by projecting the motion vector P in the distance direction is ignored, the granularity (i.e. fullness) of information displayed on the displaying unit 201 does not change.

Also, as illustrated in FIG. 5, in a case where the motion vector Q of the movement of the device 200 by the user is within a range in which it can be actually decided as a movement in the distance direction, the motion vector Q' acquired by projecting the motion vector Q in the distance direction from the device 100 is output. By this means, based on the motion vector Q', the granularity (i.e. fullness) of information displayed on the displaying unit 201 is changed. In this case, since the motion vector Q" acquired by projecting the motion vector Q in the distance direction is ignored, information displayed on the displaying unit 201 is not switched to other information.

In the following, the algorithm will be explained based on FIG. 10. First, in step S10, a decision starts. In next step S12, it is decided whether there is an input in the device 200. The flow proceeds to step S14 in a case where there is an input, and the flow returns to step S10

In step S14, a motion vector of the device 200 is detected and the flow proceeds to next step S16. In step S16, it is decided whether the motion vector of the device 200 is within an approximation range of movement in the vertical and horizontal directions, and, in a case where it is within the approximation range, the flow proceeds to step S18. In step S18, the motion vector is projected in the vertical and horizontal directions and output.

Meanwhile, in step S16, in a case where the motion vector is not within the approximation range of movement in the vertical and horizontal directions, the flow proceeds to step S20. In step S20, it is decided whether the motion vector is within an approximation range of movement in the distance direction.

In step S20, in a case where the motion vector is within the approximation range of movement in the distance direction, the flow proceeds to step S22. In step S22, the motion vector is projected in the distance direction and output.

Also, in step S20, in a case where the motion vector is not within the approximation range of movement in the distance direction, the flow proceeds to step S24. In step S24, the motion vector is output as is. In this case, both display processing based on the movement in the distance direction and display processing based on the movement in the vertical and horizontal directions are performed on the displaying unit 201.

As described above, according to the processing in the flowchart in FIG. 10, in a case where the motion vector of the device 200 is within the approximation range of movement in the vertical and horizontal directions, since the motion vector is projected in the vertical and horizontal directions and output, it is possible to perform processing with an assumption that there is no movement in the distance direction.

Also, in a case where the motion vector of the device 200 is within the approximation range of movement in the distance direction, since the motion vector is projected in the distance direction and output, it is possible to perform processing with an assumption that there is no movement in the vertical and horizontal directions.

As described above, by dividing the movement of the device 200 by the user into the movement in the vertical and horizontal directions and the movement in the distance direction and ignoring one of the movements based on user's operational intension, it is possible to prevent an operation that is not intended by the user. Therefore, it is possible to reliably reflect user's intension and display desired information on the device 200.

Figure 11:
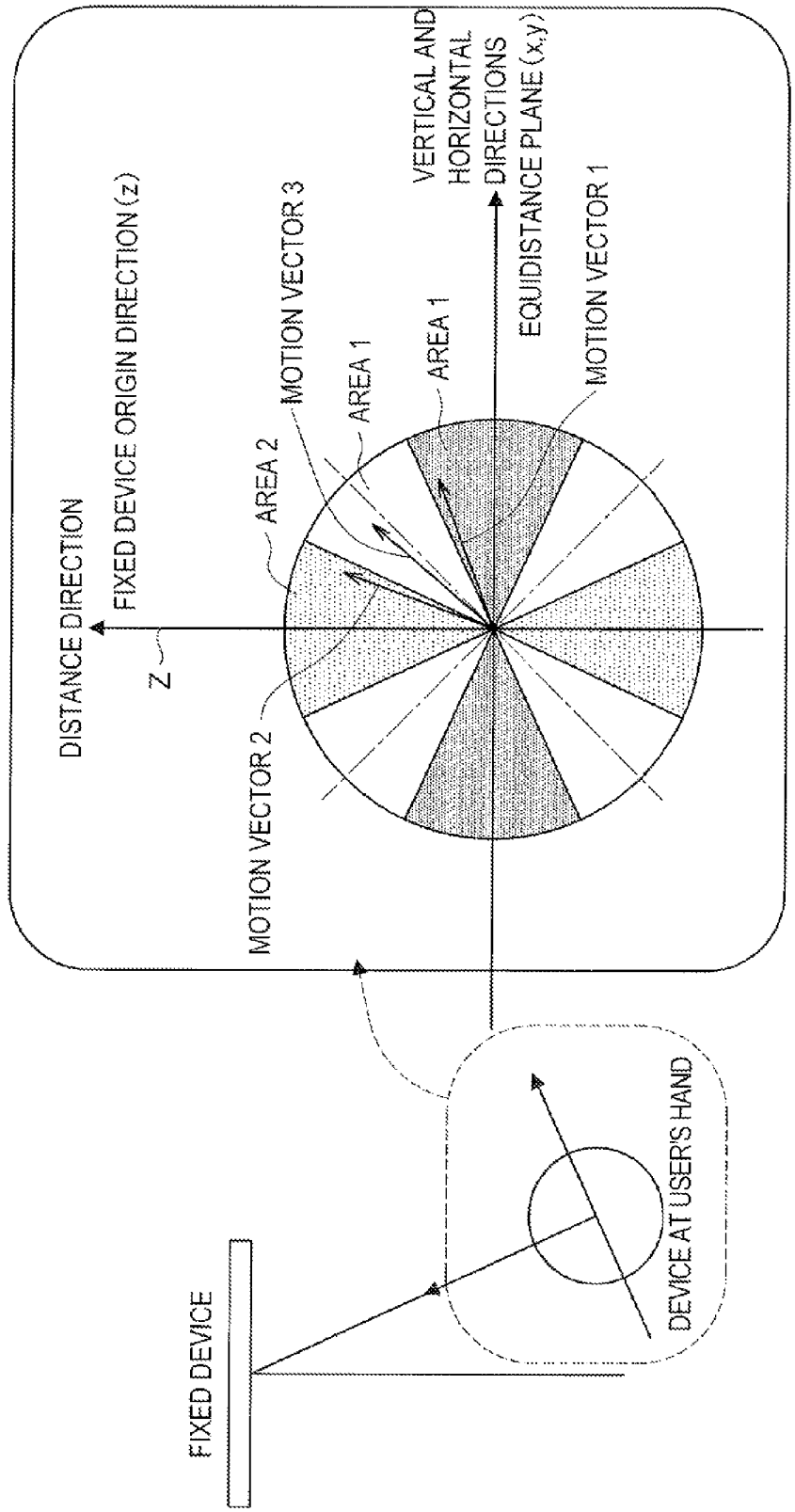
FIG. 11 is a pattern diagram illustrating a virtual space figure to decide whether there is a movement in the vertical and horizontal directions and the distance direction, in the decision step in FIG. 10.

FIG. 11 is a pattern diagram illustrating a virtual space figure to decide whether the movement in the vertical and horizontal directions and the movement in the distance direction are provided in the decision steps (i.e. steps S16 and S20) in FIG. 10. Here, there is assumed a rotator rotating areas 1 and 2, to which the hatching illustrated in FIG. 11 is attached, with respect to the z axis.

When an operation of the device 200 by the user includes both the movement in the vertical and horizontal directions and the movement in the distance direction, the movement in the vertical and horizontal directions is decided in a case where the motion vector is included in a range of a mortar-shaped rotator formed by rotating the area 1 illustrated in FIG. 11 with respect to the z axis, and this case corresponds to a motion vector 1 illustrated in FIG. 11. Also, when an operation of the device 200 by the user includes both the movement in the vertical and horizontal directions and the movement in the distance direction, the movement in the distance direction is decided in a case where the motion vector is included in a range of a conically-shaped rotator formed by rotating the area 2 illustrated in FIG. 11 with respect to the z axis, and this case corresponds to a motion vector 2 illustrated in FIG. 11. As in the case of a motion vector 3 that is not included in any of the conically-shaped rotator and the mortar-shaped rotator, the motion vector 3 is output as is (step S24 in FIG. 10). Here, the areas 1 and 2 may be expanded up to positions illustrated by dash-dotted lines in FIG. 11 such that the motion vector is included in one of the conically-shaped rotator and the mortar-shaped rotator.

As described above, according to the first embodiment, it is possible to reliably reflect user's intentional movement and display user's desirable information on the device 200.

<2. Second Embodiment>

Next, the second embodiment of the present disclosure will be explained. According to the second embodiment, in a case where a screen of the device 100 is imaged in the device 200 and information related to the screen of the device 100 is displayed on the device 200, a screen breakdown caused by movement of the device 200 is cancelled.

Figure 12:
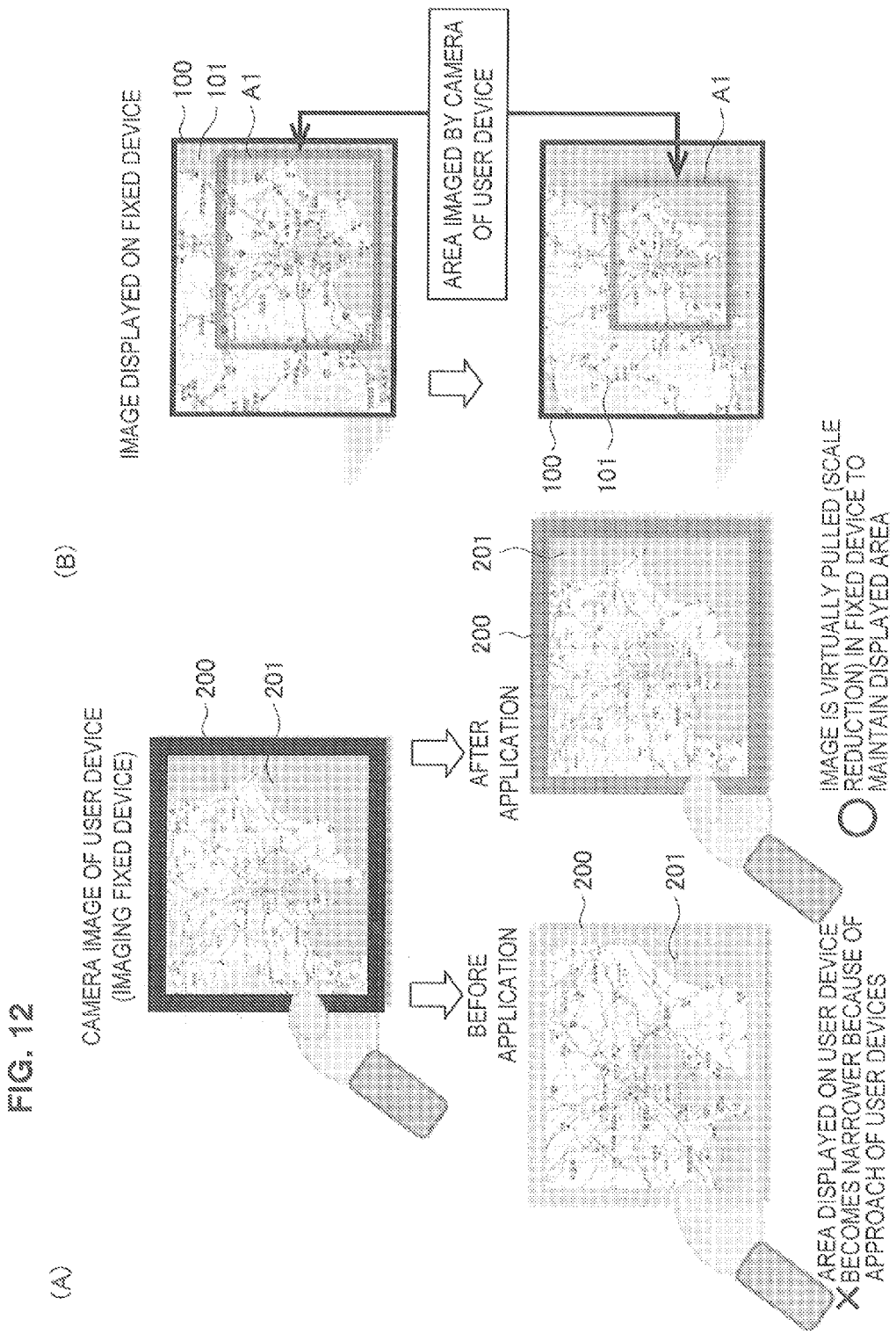
FIG. 12 is a pattern diagram illustrating an example of cancelling a screen breakdown caused by a movement in the distance direction.

FIG. 12 is a pattern diagram illustrating an example of cancelling a screen breakdown caused by a movement in the distance direction. Here, FIG. 12(B) illustrates a map of the Kanto region displayed on the displaying unit 101 of the device 100. Also, FIG. 12(A) illustrates a state where the imaging unit 230 of the device 200 images the displaying unit 101 and the displaying unit 201 displays the display content of the displaying unit 101.

According to the system disclosed in the embodiment of the present disclosure, as described in the first embodiment, by causing the device 200 to be close to the device 100, it is possible to acquire detailed information of an area shown on the map and display it on the device 200.

Meanwhile, since the device 200 images a screen of the device 100 and displays it on the displaying unit 230, when the device 200 is caused to be close to the device 100, the image displayed on the device 200 is enlarged and the display range becomes narrow. Therefore, it is assumed that, for the user, although the device 200 is caused to become close in order to display detailed information, an image range displayed on the device 200 becomes narrow and a desired range is difficult to be displayed.

Therefore, in the second embodiment, by reducing an image displayed on the device 100 when the device 200 is caused to be close to the device 100, an enlargement of the image displayed on the device 200 according to approach of the device 200 is cancelled. Here, based on information related to the position and movement of the device 200 detected in the detecting unit 102, in a case where the device 200 is caused to be close to the device 100, the display controlling unit 110c of the device 100 cancels a size change of the image displayed on the displaying unit 201 of the device 200 by reducing the image displayed on the displaying unit 101 according to the movement of the device 200. Similarly, based on information related to the position and movement of the device 200 detected in the detecting unit 102, in a case where the device 200 is caused to be away from the device 100, the display controlling unit 110c of the device 100 cancels a size change of the image displayed on the displaying unit 201 of the device 200 by enlarging the image displayed on the displaying unit 101 according to the movement of the device 200. Thus, the display controlling unit 110c functions as an imaged display controlling unit to control display content of the displaying unit 101 imaged by the device 200.

In FIG. 12(A), the illustration on the upper stage shows a display state of the displaying unit 201 of the device 200 before the device 200 is caused to be close to the device 100. Also, the illustration on the lower stage shows a display state of the displaying unit 201 of the device 200 after the device 200 is caused to be close to the device 100.

FIG. 12(A) is a pattern diagram illustrating an image display in the device 200, and, in a case where the device 200 is caused to be close to the device 100, compares a case of reducing the image displayed on the device 100 (i.e. after application) and a case of not reducing the image displayed on the device 100 (i.e. before application).

FIG. 12(B) is a pattern diagram illustrating an image display in the device 100, and, in a case where the device 200 is caused to be close to the device 100, illustrates a case of reducing the image displayed on the device 100. In FIG. 12(B), the illustration on the upper stage shows a display state of the displaying unit 101 of the device 100 before the device 200 is caused to be close to the device 100. Also, the illustration on the lower stage shows a display state of the displaying unit 101 of the device 100 after the device 200 is caused to be close to the device 100.

As illustrated in the graphic of "after application" in FIG. 12(A), in the case of reducing an image displayed on the device 100 when the device 200 comes close, it is possible to cancel an enlargement of an image of the displaying unit 201, which is caused by causing the device 200 to be close to the device 100, and it is possible to provide the same display range between an image before the movement of the device 200 and an image after the movement of the device 200. In this case, as illustrated in FIG. 12(B), although the area A1 on the displaying unit 101 imaged by the imaging unit 230 of the device 200 becomes narrower as the device 200 is closer to the device 100, since an image displayed on the displaying unit 101 is reduced, as a result, a range of the area A1 imaged by the imaging unit 230 and displayed on the displaying unit 201 does not change. Therefore, it is possible to display more detailed information as to displayed range information, in a state where the display range is not changed by access of the device 200, without providing a feeling of strangeness to the user.

Meanwhile, as illustrated in the graphic of "before application" in FIG. 12(A), if an image displayed on the device 100 at the time of access of the device 200 continues to be displayed at the identical size without reduction, compared to the image before the movement, the image after the movement is enlarged. Therefore, for the user, although the device 200 is caused to become close in order to display detailed information, an image range displayed on the device 200 becomes narrow, which provides a feeling of strangeness to the user.

Figure 13:
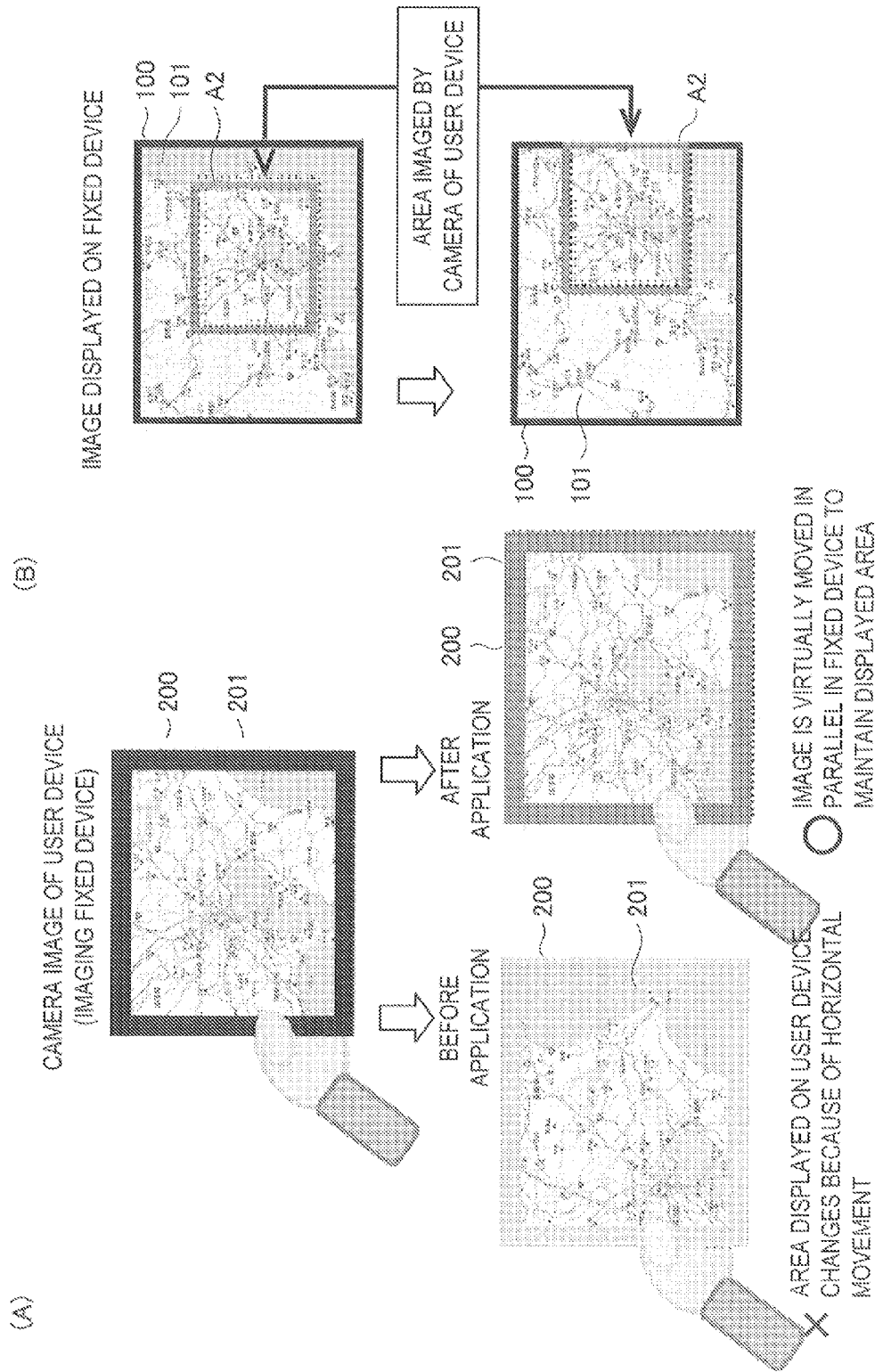
FIG. 13 is a pattern diagram illustrating an example of cancelling a screen breakdown caused by a movement in the vertical and horizontal directions.

FIG. 13 is a pattern diagram illustrating an example of canceling a screen breakdown caused by a movement in the vertical and horizontal directions. Here, FIG. 13(B) illustrates a map of the Kanto region displayed on the displaying unit 101 of the device 100. Also, FIG. 13(A) illustrates a state where the imaging unit 230 of the device 200 images the displaying unit 101 and the displaying unit 201 displays the display content of the displaying unit 101.

In the system according to an embodiment of the present disclosure, as described in the first embodiment, by moving the device 200 in the vertical and horizontal directions, the user can change a selection target in an area shown on the map.

Since the device 200 images a screen of the device 100 and displays it on the displaying unit 210, when the device 200 is moved in the vertical and horizontal directions with respect to the device 100, an image displayed on the device 200 is moved. Therefore, for the user, it is assumed that, although the device 200 is moved in the vertical and horizontal directions in order to change a selection target, an image range displayed on the device 200 changes and a desired target is difficult to be selected.

Therefore, in the second embodiment, by moving an image displayed on the device 100 in the same direction as a movement of the device 200 when moving the device 200 in the vertical and horizontal directions with respect to the device 100, a movement of an image displayed on the displaying unit 201 of the device 200 is cancelled. Here, based on information related to the position and movement of the device 200 detected in the detecting unit 102, by moving the image displayed on the displaying unit 101 in the same direction as the movement of the device 200, the display controlling unit 110c of the device 100 cancels the movement of the image displayed on the displaying unit 201 of the device 200.

In FIG. 13(A), the illustration on the upper stage shows a display state of the displaying unit 201 of the device 200 before the device 200 is moved in the vertical and horizontal directions. Also, the illustration on the lower stage shows a display state of the displaying unit 201 of the device 200 after the device 200 is moved in the vertical and horizontal directions.

FIG. 13(A) is a pattern diagram illustrating an image display in the device 200, and, in a case where the device 200 is moved in the vertical and horizontal directions, compares a case of moving an image displayed on the device 100 (i.e. after application) and a case of not moving the image displayed on the device 100 (i.e. before application).

FIG. 13(B) is a pattern diagram illustrating an image displayed on the device 100, and, in a case where the device 200 is moved in the vertical and horizontal directions, illustrates a case where the image displayed on the device 100 is moved in the vertical and horizontal directions. In FIG. 12(B), the illustration on the upper stage shows a display state of the displaying unit 101 of the device 100 before the device 200 is moved in the vertical and horizontal directions. Also, the illustration on the lower stage shows a display state of the displaying unit 101 of the device 100 after the device 200 is moved in the vertical and horizontal directions.

As illustrated in the graphic of "after application" in FIG. 13(A), in the case of moving an image displayed on the device 100 when the device 200 is moved in the vertical and horizontal directions, it is possible to cancel a movement of an image of the displaying unit 201, which is caused by moving the device 200 in the vertical and horizontal directions, and it is possible to provide the same display range between an image before the movement of the device 200 and an image after the movement of the device 200. In this case, as illustrated in FIG. 13(B), although the area A2 on the displaying unit 101 imaged by the imaging unit 230 of the device 200 is moved on the displaying unit 101 according to the movement of the device 200, since an image displayed on the displaying unit 101 is moved, as a result, a range of the area A2 imaged by the imaging unit 230 and displayed on the displaying unit 201 does not change. Therefore, it is possible to select a desired target from information of a display range in a state where the display range is not changed by the movement of the device 200 in the vertical and horizontal directions, without providing a feeling of strangeness to the user.

As illustrated in FIG. 13(B), if the image displayed on the device 100 is moved in the opposite direction at the time of moving the device 200 in the vertical and horizontal directions, it is possible to provide the same display range in the displaying unit 201 between an image before the movement and an image after the movement. Therefore, it is possible to select desired information from the information displayed on the displaying unit 201 in a state where a range displayed on the displaying unit 201 is not changed by the movement of the device 200 in the vertical and horizontal directions, without providing a feeling of strangeness to the user.

Meanwhile, as illustrated in the graphic of "before application" in FIG. 13(A), if an image displayed on the device 100 continues to be displayed in the identical range without movement when the device 200 is moved in the vertical and horizontal directions, compared to the image before the movement, the image after the movement is enlarged on the displaying unit 201 of the device 200. Therefore, for the user, although the device 200 is moved in order to select desired information from the information displayed on the displaying unit 201, an image range displayed on the device 200 changes, which provides a feeling of strangeness.

As described above, according to the second embodiment, by changing an image of the device 100, it is possible to cancel a display range change of the device 200, which is caused by a movement of the device 200. Therefore, without causing a breakdown of a display screen by user's operation, it is possible to prevent a feeling of strangeness from being provided to the user. By this means, the user can move the device 200 and perform a desired operation.

<3. Third Embodiment>

Next, the third embodiment of the present disclosure will be explained. According to the third embodiment, the decision criteria in steps S16 and S20 described in FIG. 11 in the first embodiment are changed based on used content, the size of the device 100 on the fixing side and a positional relationship between the device 100 and the device 200.

Figure 14:
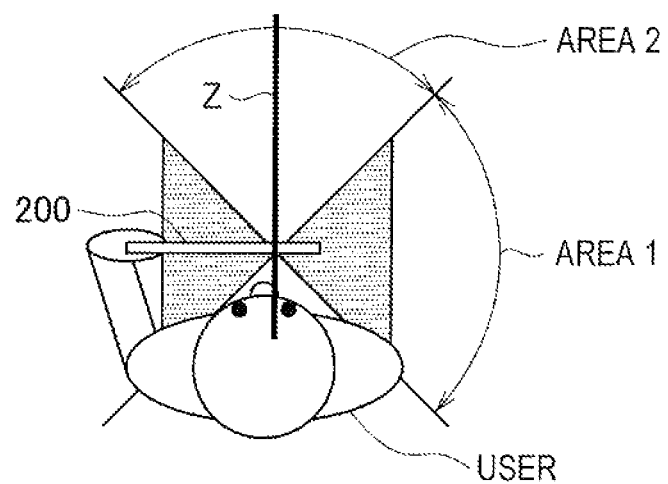
FIG. 14 is a pattern diagram illustrating an example enlarging areas 1 and 2 in a space figure of a decision criterion in FIG. 11.

FIG. 14 is a pattern diagram illustrating an example where, in the space figure of decision criterion in FIG. 11, the areas 1 and 2 are expanded up to positions illustrated by dash-dotted lines in FIG. 11 and the motion vector is included in one of the conically-shaped rotator and the mortar-shaped rotator. Similar to FIG. 11, FIG. 14 illustrates a state seen from the top of the user, and the mortar-shaped area formed by rotating the area 1 illustrated in FIG. 14 with respect to the z axis denotes an area to decide a vertical and horizontal movement, and the remaining conically-shaped area (i.e. conically-shaped area formed by rotating the area 2 with respect to the z axis) denotes an area to decide a back and front movement.

As illustrated in FIG. 11, in FIG. 14, in a case where the movement direction in a micro time of the user is within a range of the area 1, it is decided as the vertical and horizontal movement, and the back and front movement is cancelled. Meanwhile, in a case where the movement direction in a micro time of the user is within a range of the area 2, it is decided as the back and front movement, and the vertical and horizontal movement is cancelled.

Figure 15:
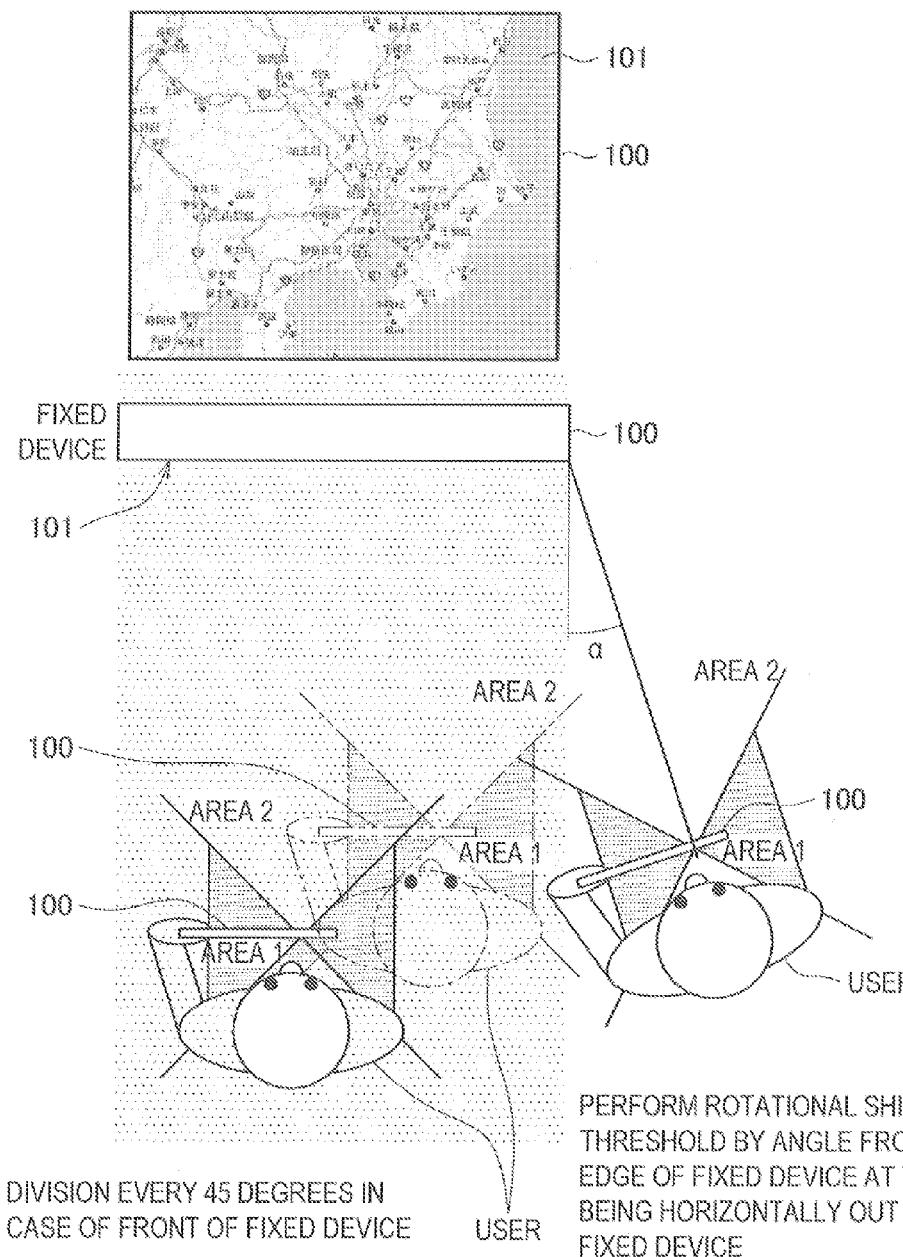
FIG. 15 is a pattern diagram illustrating a state of changing a decision area illustrated in FIG. 14, in a case where a device owned by a user moves with respect to a displaying unit of a fixed device.

FIG. 15 is a pattern diagram illustrating a state where the decision areas illustrated in FIG. 14 are changed when the device 200 is moved with respect to the displaying unit 101 of the device 100. Here, FIG. 15 illustrates a case where the user uses planar content. Examples of the planar content include an application to learn the geography and history using a map.

As illustrated in FIG. 15, in a case where the device 200 is in the front range of the displaying unit 101 of the device 100, a decision is made while the areas 1 and 2 illustrated in FIG. 14 are not changed from the states illustrated in FIG. 14.

Meanwhile, in a case where the device 200 is out of the front range of the displaying unit 101 of the device 100, the user changes an aspect of the device 200 such that an aspect of the device 200 is directed to the center of the displaying unit 101. Therefore, as illustrated in FIG. 15, when the device 200 is horizontally out of the front range of the displaying unit 101 of the device 100, decision thresholds (i.e. areas 1 and 2 illustrated in FIG. 14) are subjected to rotational shift by an angle formed with an extended line from the edge of the device 100 (i.e. angle α illustrated in FIG. 15). By this means, since it is possible to change the decision thresholds according to a position of the device 200, even in a case where the device 200 is positioned outside the front of the displaying unit 101, the user can perform an operation without having a feeling of strangeness.

Also, FIG. 16 illustrates a case where the user uses stereoscopic content (i.e. 3D image). Here, a 3D globe is provided as stereoscopic content. In the case of stereoscopic content, in the case of performing a movement in the vertical and horizontal directions, the user moves in the circumferential direction with respect to the 3D image. Therefore, with the user's movement, the decision thresholds (i.e. areas 1 and 2) are rotated by an angle change (i.e. a illustrated in FIG. 16) of the device 200 with respect to the device 100. By this means, since it is possible to change the decision thresholds according to the position of the device 200, the user can perform an operation without having a feeling of strangeness.

As described above, according to the third embodiment, the decision criteria in steps S16 and S20 described in FIG. 11 in the first embodiment are changed based on used content, the size of the device 100 on the fixing side and a positional relationship between the device 100 and the device 200, and therefore the user can perform an operation without having a feeling of strangeness.

<4. Fourth Embodiment>

Next, the fourth embodiment of the present disclosure will be explained. In the fourth embodiment, an explanation will be given to a specific example of a display content change depending on the movements in the vertical and horizontal directions and distance direction of the device 200.

FIG. 17 is a pattern diagram illustrating an example where a display of the displaying unit 201 changes depending on a movement in the distance direction of the device 200. Here, an explanation will be given using an example of time and history learning content. As illustrated in FIG. 17, the displaying unit 101 of the device 100 displays a map near Greece. The imaging unit 230 of the device 200 images the displaying unit 101 and the displaying unit 201 of the device 200 displays the display content of the displaying unit 101. In a case where the device 200 locates in a position 1, the displaying unit 201 displays display content of the displaying unit 101 and current information (i.e. 21st century) related to the map.

When the user causes the device 200 to be close to the device 100 and the device 200 locates in a position 2, information of the Eastern Roman Empire era is displayed on the map. Also, when the user causes the device 200 to be closer to the device 100 and the device 200 locates in a position 3, information of the Nerva-Antonine Dynasty era is displayed on the map. Thus, based on the positions of the devices 200 and 100 in the distance direction, information displayed on the displaying unit 201 of the device 200 changes with respect to the time and era. By this means, when the system illustrated in FIG. 17 is used as an education tool and multiple users use their own devices 200, by moving the device 200 in the distance direction, each user can acquire information of the desired age.

Also, in the example of FIG. 17, the distance between the device 100 and the device 200 may not be associated with information of the time (or age). Since the density of information varies depending on the age, it may be possible to dynamically change an association ratio between an operation in the distance direction and the time (or age) according to the density of information.

Next, in FIG. 18, an explanation will be given using an example of a display of a news site. As illustrated in FIG. 18, the displaying unit 101 of the device 100 displays headlines of multiple news articles. The imaging unit 230 of the device 200 images the displaying unit 101 and the displaying unit 201 of the device 200 displays the display content of the displaying unit 101. By moving the device 200 in the vertical and horizontal directions, the user can select desired news from multiple items of news displayed on the displaying unit 201. The selected news is displayed with highlight unlike surrounding news items that are not selected.

Here, a case is exemplified where, among the news items displayed on the displaying unit 101, an article about "TPP (Trans-Pacific Partnership)" is selected and displayed on the displaying unit 201. In a case where the device 200 locates in the position 1, news or topic of the highest conception related to TPP is displayed. When the user causes the device 200 to be close to the device 100 and the device 200 locates in the position 2, the article of each newspaper company is displayed. Also, when the user causes the device 200 to be closer to the device 100 and the device 200 locates in the position 3, more detailed information such as supporter opinions related to TPP, opponent opinions related to TPP and public comments on Internet message boards is displayed. Thus, based on the positions of the devices 200 and 100 in the distance direction, the detail level of news displayed on the displaying unit 201 of the device 200 changes. By this means, by moving the device 200 in the distance direction, each user can acquire desired information.

Thus, in the example illustrated in FIG. 18, as the device 200 becomes closer to the device 100, more detailed information displayed on the device 200 is provided. Also, in addition to AR image superimposition, an operation of switching to a picture having a more detailed background at the time of access may be performed.

Next, in FIG. 19, an explanation will be given using an example of a display of 3D content. As illustrated in FIG. 19, the displaying unit 101 of the device 100 displays 3D bronze statue appreciation content. The imaging unit 230 of the device 200 images the displaying unit 101 and the displaying unit 201 of the device 200 displays the display content of the displaying unit 101 in a 3D mode.

In a case where the device 200 locates in the position 1, the displaying unit 201 displays the display content of the displaying unit 101 and basic information related to the bronze statue (such as the name and creator of the bronze statue). When the user causes the device 200 to be close to the device 100 and the device 200 locates in the position 2, for example, a story of the bronze statue and museum information is displayed. Also, when the user causes the device 200 to be closer to the device 100 and the device 200 locates in the position 3, more detailed information is displayed, which includes the spiritual nature, time background and artful acknowledgement of the bronze statue and which is suggested by the molding of each part of the bronze statue. Thus, by moving the device 200 back and forth, the user can display 3D content and adjust the detail level of related information. Further, by performing a vertical and horizontal (or wraparound) movement, the user can come around and appreciate the side of the bronze statue.

As described above, according to the fourth embodiment, by changing the distance between the device 200 and the device 100, it is possible to adjust the detail level of information. Also, by moving the device 200 in the vertical and horizontal directions, it is possible to select desired information from information displayed on the displaying unit 201.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1) An information processing apparatus including:

a positional information acquiring unit acquiring information related to a movement of an operation target by a user operation; and a display control information generating unit generating control information to control display content, based on the information related to the movement, wherein, among a first direction component and a second direction component of the movement, the display control information generating unit preferentially generates the control information for the first direction component.

(2) The information processing apparatus according to (1), wherein the display control information generating unit cancels the second direction component of the movement to generate the control information.

(3) The information processing apparatus according to (2), wherein, in a case where a magnitude of the second direction component of the movement is equal to or less than a predetermined value, the display control information generating unit cancels the second direction component of the movement to generate the control information.

(4) The information processing apparatus according to (3), wherein the first direction component is a component of the movement along a direction toward an apparatus that displays the display content, and the second direction component is a component along a direction orthogonal to the direction toward the apparatus that displays the display content.

(5) The information processing apparatus according to (1), further including:
a display controlling unit controlling display content displayed on a displaying unit, based on the control information.

(6) The information processing apparatus according to (4), further including:
an imaging unit imaging an object,
wherein the display controlling unit controls the display content including an image imaged by the imaging unit, based on the control information.

(7) The information processing apparatus according to (1), further including:
a transmitting unit transmitting the control information to a device having a displaying unit.

(8) The information processing apparatus according to (7), wherein the device including the displaying unit includes an imaging unit, and
wherein the information processing apparatus further includes:
an imaged displaying unit imaged by the imaging unit; and
an imaged display controlling unit controlling display content in the imaged displaying unit based on the information related to the movement.

(9) The information processing apparatus according to (8), wherein the imaged display controlling unit controls the display content in the imaged displaying unit based on the information related to the movement, such that a range of an image of the imaged displaying unit imaged by the imaging unit does not change.

(10) The information processing apparatus according to (8), wherein, based on the information related to the movement, the imaged display controlling unit reduces the display content in the imaged displaying unit in a case where the device including the displaying unit comes close, and enlarges the display content in the imaged displaying unit in a case where the device including the displaying unit comes away.

(11) The information processing apparatus according to (8), wherein, based on the information related to the movement, in a case where the device including the displaying unit is moved in vertical and horizontal directions, the imaged display controlling unit moves the display content in the imaged displaying unit in same directions as directions of the movement.

(12) The information processing apparatus according to (3), wherein the display control information generating unit changes the predetermined value based on the information related to the movement.

(13) The information processing apparatus according to (5), wherein the display controlling unit performs a process of selecting a target from information displayed on the displaying unit, based on the information related to the movement.

(14) The information processing apparatus according to (5), wherein the display controlling unit changes a detail level of information displayed on the displaying unit, based on the information related to the movement.

(15) The information processing apparatus according to (5), wherein the display controlling unit changes and displays an era of information displayed on the displaying unit, based on the information related to the movement.

(16) An information processing method including:
acquiring information related to a movement of an operation target by a user operation; and
generating control information to control display content based on the information related to the movement for, among a first direction component and a second direction component of the movement, preferentially the first direction component.

(17) A program for causing a computer to function as:
a mechanism acquiring information related to a movement of an operation target by a user operation; and
a mechanism generating control information to control display content based on the information related to the movement for, among a first direction component and a second direction component of the movement, preferentially the first direction component.

What is claimed is:

1. An information processing apparatus comprising:
a positional information acquiring unit acquiring information related to a movement of an operation target device by a user operation,
wherein the operation target device acquires the information related to the movement of the operation target device based on an image of a predetermined landmark of the information processing apparatus; and
a display control information generating unit generating control information to control display content, based on the information related to the movement,
wherein, the display control information generating unit generates the control information, for at least one of a first direction component and a second direction component of the movement, based on a comparison result of a magnitude of the first direction component and a magnitude of the second direction component.

2. The information processing apparatus according to claim 1, wherein the display control information generating unit cancels the first direction component or the second direction component based on the comparison result of the movement to generate the control information.

3. The information processing apparatus according to claim 1, wherein, in a case where the magnitude of the first direction component or the magnitude of the second direction component of the movement is equal to or less than a predetermined value, the display control information generating unit cancels the first direction component or the second direction component of the movement to generate the control information.

4. The information processing apparatus according to claim 3, wherein the display control information generating unit changes the predetermined value based on the information related to the movement.

5. The information processing apparatus according to claim 1, wherein the first direction component is a component of the movement along a direction toward the operation target device that displays the display content, and the second direction component is a component along a direction orthogonal to the direction toward the operation target device that displays the display content.

6. The information processing apparatus according to claim 1, further comprising:
a display controlling unit controlling the display content displayed on a displaying unit, based on the control information.

7. The information processing apparatus according to claim 6, wherein the display controlling unit performs a process of selecting a target from information displayed on the displaying unit, based on the information related to the movement.

8. The information processing apparatus according to claim 6, wherein the display controlling unit changes a detail level of information displayed on the displaying unit, based on the information related to the movement.

9. The information processing apparatus according to claim 6, wherein the display controlling unit changes and displays time-series content of information displayed on the displaying unit, based on the information related to the movement.

10. The information processing apparatus according to claim 1, wherein the operation target device further comprises:
an imaging unit imaging an object, and
a display controlling unit controlling the display content including an image imaged by the imaging unit, based on the control information.

11. The information processing apparatus according to claim 1, further comprising:
a transmitting unit transmitting the control information to the operation target device having a displaying unit.

12. The information processing apparatus according to claim 11, wherein the operation target device, including the displaying unit, includes an imaging unit, and wherein the information processing apparatus further comprises:
an imaged displaying unit imaged by the imaging unit; and
an imaged display controlling unit controlling display content in the imaged displaying unit based on the information related to the movement.

13. The information processing apparatus according to claim 12, wherein the imaged display controlling unit controls the display content in the imaged displaying unit based on the information related to the movement, such that a range of an image of the imaged displaying unit imaged by the imaging unit does not change.

14. The information processing apparatus according to claim 12, wherein, based on the information related to the movement, the imaged display controlling unit reduces the display content in the imaged displaying unit in a case where the operation target device including the displaying unit comes close, and enlarges the display content in the imaged displaying unit in a case where the operation target device including the displaying unit comes away.

15. The information processing apparatus according to claim 12, wherein, based on the information related to the movement, in a case where the operation target device including the displaying unit is moved in vertical and horizontal directions, the imaged display controlling unit moves the display content in the imaged displaying unit in same directions as the directions of the movement.

16. The information processing apparatus according to claim 1,
wherein the display control information generating unit generates the control information, for the first direction component of the movement, in an event of the magnitude of the first direction component being greater than the magnitude of the second direction component.

17. The information processing apparatus according to claim 1,
wherein the display control information generating unit generates the control information, for the second direction component of the movement, in an event of the magnitude of the second direction component being greater than the magnitude of the first direction component.

18. An information processing method comprising:
acquiring information related to a movement of an operation target device by a user operation,
wherein the operation target device acquires the information related to the movement of the operation target device based on an image of a predetermined landmark of an information processing apparatus; and
generating control information to control display content based on the information related to the movement,
wherein, the control information is generated for at least one of a first direction component and a second direction component of the movement, based on a comparison result of a magnitude of the first direction component and a magnitude of the second direction component.

19. A non-transitory computer-readable medium having stored thereon, a set of computer-executable instructions for causing a computer to perform steps comprising:
acquiring information related to a movement of an operation target device by a user operation,
wherein the operation target device acquires the information related to the movement of the operation target device based on an image of a predetermined landmark of an information processing apparatus; and
generating control information to control display content based on the information related to the movement,
wherein the control information is generated for at least one of a first direction component and a second direction component of the movement, based on a comparison result of a magnitude of the first direction component and a magnitude of the second direction component.

* * * * *